United States Patent [19]

Dzung

[11] Patent Number: 4,862,481
[45] Date of Patent: Aug. 29, 1989

[54] SIGNAL TRANSMISSION PROCESS
[75] Inventor: Dacfey Dzung, Wettingen, Switzerland
[73] Assignee: BBC Brown Boveri AG, Baden, Switzerland
[21] Appl. No.: 196,494
[22] Filed: May 20, 1988
[30] Foreign Application Priority Data
May 25, 1987 [CH] Switzerland ............ 2011/87
[51] Int. Cl.$^4$ ............................................. H04L 27/10
[52] U.S. Cl. ...................... 375/57; 375/17; 371/43
[58] Field of Search .......... 375/17, 37, 39, 53, 375/57, 58, 67; 371/43, 44, 45; 340/347 DD

[56] References Cited

U.S. PATENT DOCUMENTS

| 3,891,959 | 6/1975 | Tsuji et al. | 371/43 |
| 4,601,044 | 7/1986 | Kromer, III et al. | 375/17 |
| 4,631,735 | 12/1986 | Qureshi | 375/34 |
| 4,646,305 | 2/1987 | Trelter et al. | 375/39 |
| 4,700,363 | 10/1987 | Tomlinson et al. | 371/43 |
| 4,710,746 | 12/1987 | Shimoda et al. | 371/43 |

FOREIGN PATENT DOCUMENTS 0050930 5/1982 European Pat. Off. .

OTHER PUBLICATIONS

C. Wong et al., "Optimal Short Impulse Response Channels for an MLSE Receiver", International Conference on Communications ICC 79 Boston US, 10–14 Jun. 1979, vol. 2, IEEE.
Bearr, "The Choice of the Desired Impulse Response in Combined Linear-Viterbi Algorithm Equalizers", IEEE Transactions on Communications, vol. COM-26, No. 8, Aug. 1978, IEEE N.Y. US.
Alvin et al., "MSK-Type Receivers for Partial Response Continuous Phase Modulation", // International Conference on Communication ICC 82, Philadelphia, US, 13–17 Jun. 1983, vol. 3, IEEE N.Y. US.

Primary Examiner—Robert L. Griffin
Assistant Examiner—Stephen Chin
Attorney, Agent, or Firm—Oblon, Spivak, McClelland, Maier & Neustadt

[57] ABSTRACT

During a signal transmission process, digital data are reproduced in a transmitter in accordance with a given process for the continuous phase modulation of a carrier wave (CPM) in a time-dependent envelope curve, the envelope curve is transmitted by the carrier wave via a channel with a given unit pulse response, an additive, white Gaussian noise being superimposed, the digital data are sent through a channel-specific filter and sampled in a receiver, and a sequence of estimated symbols is determined with an optimization algorithm.

4 Claims, 5 Drawing Sheets

SIGNAL TRANSMISSION PROCESS

BACKGROUND OF THE INVENTION

1. Field of the Invention

The invention relates to a signal transmission process in which, in a transmitter, digital data which are present as a sequence of symbols, which symbols have a given time interval T and may assume M values, are reproduced, in accordance with a given process for the continuous phase modulation of a carrier wave, in a time-dependent envelope curve v(t) using a baseband filter r(t), the envelope curve v(t) is transmitted by means of the carrier wave via a channel with a given unit pulse response $h_c(t)$, an additive, white Gaussian noise w(t) being superimposed so that a signal y(t) of the form y(t)=$h_c$*v(t)+w(t) ("*" denotes a convolution product) is present at a receiver, the signal y(t) is filtered by an adjoined baseband filter of the form $r^+(-t)$ ("+" denotes Hermitian adjoint), is sampled at points of time kT, where k denotes an integer and a sequence of estimated symbols is determined by an optimization algorithm.

DISCUSSION OF BACKGROUND

At the same time as the increasingly widespread use of digital signal processing, the need for reliable, efficient digital signal transmission processes is growing. In principle there are two possible processes here, namely one where the amplitude and one where the phase of a carrier wave is modulated. Phase modulation is however of greater significance, as it can be shown that for a given signal-to-noise ratio, smaller error probabilities can be obtained with a phase modulation than with an amplitude modulation.

An important parameter of signal transmission processes is the band width required for a given data signalling rate. This parameter assumes particularly favorable values in processes which function according to the principle of continuous phase modulation (CPM).

A process of this kind is described in "Continuous Phase Modulation, Part I and Part II", Aulin et al, IEEE Trans. Communications, Vol. COM-29, March 1981. Here digital data are reproduced with the aid of a CPM process in a send signal, transmitted through a channel, an additive, white Gaussian noise being superimposed upon the send signal, and demodulated in a receiver. The aim during demodulation is to keep the error probability as small as possible.

In the abovementioned printed publication, an ideal channel is assumed. In fact and in reality however, the channel will have a given transmission function, which will result in a so-called inter-symbol interference (ISI), ie. the encoded symbols will not be independent of each other.

SUMMARY OF THE INVENTION

Accordingly, one object of this invention is to provide a novel process of the type mentioned at the start which takes account of the inter-symbol interference resulting from a transmission channel which is not ideal.

This object is achieved as set out in the defining part of patent claim 1.

The core of the invention is that the received signal is first sent through a channel-specific filter, so that a digital signal with sufficient statistics results during the sampling. Depending on requirements, the subsequent optimization algorithm can be designed in an optimum or suboptimum manner.

A preferred embodiment of the invention relates to an optimization algorithm which functions according to the principle of the maximum likelihood. This means that the sequence of estimated symbols determined by the optimization algorithm corresponds to the sequence of symbols sent with a smallest error probability. An algorithm of this type is termed optimum.

In a further, preferred embodiment of the invention, before the optimization algorithm a linear pre-emphasis filter is used which takes account of an inter-symbol interference in a suboptimum manner. The advantage of a filter of this kind lies in the fact that a conventional optimization algorithm can be used, but the inter-symbol interference can nevertheless be almost completely eliminated.

BRIEF DESCRIPTION OF THE DRAWINGS

A more complete appreciation of the invention and many of the attendant advantages thereof will be readily obtained as the same becomes better understood by reference to the following detailed description when considered in connection with the accompany drawings, wherein.

DESCRIPTION OF THE PREFERRED EMBODIMENTS

Referring now to the drawings, wherein like reference numerals designate identical or corresponding parts throughout the several views, in a first exemplary embodiment a signal transmission process is described which utilizes an optimization algorithm which works according to the principle of maximum likelihood (MLSE=Maximum Likelihood Sequence Estimator).

Figure 1:
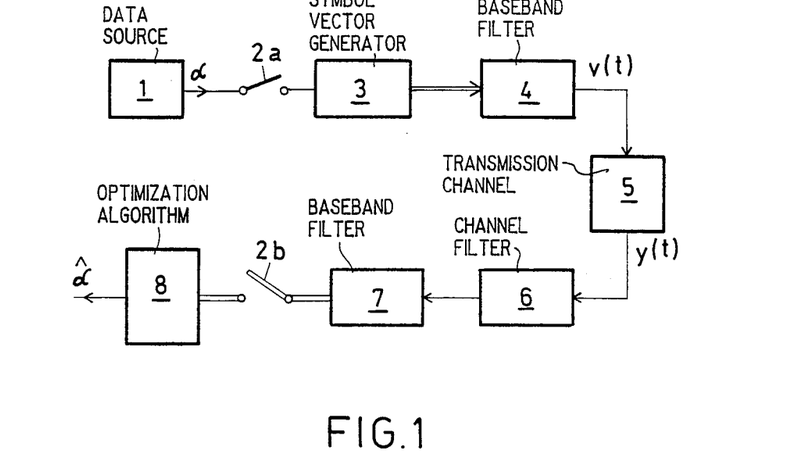
FIG. 1 shows a block diagram of the signal transmission process.

FIG. 1 illustrates a block diagram of such a signal transmission process. A data source 1 supplies symbols $a_k$ at a time interval T. Each symbol $a_k$ can assume M possible values. Without restriction to the generality, a value range can be specified as the M values +1, −1, +3, −3, ..., −(M−1). A sampling device 2a supplies a symbol to a symbol vector generator 3 at each point of time kT, where k denotes an integer. A baseband filter 4 generates a time-dependent envelope curve v(t).

The data source 1, the sampling device 2a, the vector generator 3 and the baseband filter 4 are parts of a transmitter.

With the envelop curve v(t), a carrier wave is phase-modulated and transmitted in a conventional manner. During the transmission, the carrier wave is subject to a transformation in accordance with a given transmission function $h_c(t)$ of a channel 5. This results in an undesired inter-symbol interference (ISI), ie. neighboring symbols influence each other in an undesired manner. In addition, an additive, white Gaussian noise $w(t)$ is superimposed upon the carrier wave.

In a receiver there is a channel-specific filter 6, an adjoined baseband filter 7, a sampling device 2b and an optimization algorithm 8. The sampling device 2b samples the output signal of the adjoined baseband filter 7 at time intervals $kT$ and the optimization algorithm 8 supplies estimated symbols $\hat{a}$.

The signal transmission process, in particular the part thereof which takes place in the receiver, will now be described in more detail. The mathematic formalism of the baseband representation will be used for this.

In the scalar representation, a phase-modulated carrier wave of the frequency $f_c$ has the form $$s(t) = Re[\exp(j2\pi f_c t) v(t)] \tag{I}$$

$v(t)$ denotes the complex, time-dependent envelope curve:

$$v(t) = \sum_{k=-\infty}^{+\infty} \exp(j\phi_k(t)) \tag{II}$$

$$\phi_k(t) = \pi h \sigma_{k-L} + \sum_{i=1k-(L-1)}^{k} 2\pi h a_i q(t - iT) \tag{III}$$

with $kT \leq t \leq (k+1)T$ $$\sigma_k = \sum_{i=-\infty}^{k} a_i$$

$h$ = modulation index $v(t)$ carries the actual information. $q(t)$ denotes a phase pulse which extends over a given number $L$ of symbols:

$$q(t) = \begin{cases} 0 & \text{for } t \leq 0 \\ 1/2 & \text{for } t \geq LT \end{cases} \tag{IV}$$

The representation equivalent to the scalar representation is the baseband representation which is more suitable for explaining the invention. The envelope curve $v(t)$ then takes the following form:

$$v(t) = \sum_{k=-\infty}^{+\infty} c_k' \, r(t - kT) \tag{V}$$

($c_k 1$ denotes the vector transposed to $c_k$).

The vector $c_k$ denotes a symbol vector and has a dimension of $M^L$. It is obtained from an L-times Kronecker product of M-dimensional vectors:

$$c_k = \exp(j\pi h \sigma_{k-L})[a_k \times a_{k-1} \times \ldots \times a_{k-(L-1)}] \tag{VI}$$

where $$a_k = \begin{bmatrix} \delta_{+1'\,a_k} \\ \delta_{-1'\,a_k} \\ \delta_{+3'\,a_k} \\ \cdot \\ \cdot \\ \cdot \\ \delta_{-(M-1)'\,a_k} \end{bmatrix} \quad (\delta = \text{Kronecker delta})$$

$r(t)$ is a baseband filter and is similarly obtained from an L-times Kronecker product of M-dimensional vectors:

$$r(t) = d(t) \times d(t + T) \times \ldots \times d(t + (L-1)T) \tag{VII}$$

$0 \leq t \leq T$ where $$d(t) = \begin{bmatrix} \exp(+j2\pi h q(t)) \\ \exp(-j2\pi h q(t)) \\ \exp(+3j2\pi h q(t)) \\ \cdot \\ \cdot \\ \cdot \\ \exp(-(M-1)j2\pi h q(t)) \end{bmatrix}$$

One should note that the symbol vector $c_k$ consists of an added up phase part $\exp(j\pi h \sigma_{k-L})$ and a vector which has a "1" at the position which corresponds to the sequence of the L symbols $$\{a_k^L\} \triangleq \{a_k, a_{k-1}, \ldots, a_{k-(L-1)}\}$$

The sequence of symbol vectors $\{c_k\}$ is a generalized data sequence which contains the entire information of the sequence of symbols $\{a c_k\}$. The baseband filter $r(t)$ generates the pulse form. $r(t)$ is only different from 0 in interval $O \ldots T$. Each component $r(t)$ corresponds to the pulse which is obtained on the basis of a defined sequence of symbols $\{a_K^L\}$.

After running through channel 5, the envelop curve $v(t)$ is transformed into a single of the form $$y(t) = h_c * v(t) + w(t) \tag{IX}$$

("*" denotes the convolution product), ie. in the baseband representation $$y(t) = \sum_{k=-\infty}^{\infty} c_k' * h(t - kT) + w(t) \tag{X}$$

with the definition $$h(t) = \int_{-\infty}^{\infty} h_c(\tau) \, r(t - \tau) d\tau$$

The following can be said of $h(t)$: If $h_c(t)$ is different from 0 in a time interval $\tau_0 < 0$ to $\tau_1 > 0$, then $h(t)$ is different from 0 in a time interval $\tau_0$ to $\tau_1 + T$. This means that the terms in (X) overlap. One speaks therefore of an inter-symbol interference.

In order to obtain a sequence of estimated symbols $\{\hat{a}_k\}$ from the signal $y(t)$, the signal must be sampled. Before the sampling, the signal is however sent through the adjoined baseband filter 7.

The core of the invention is therefore to filter the time-continuous signal y(t) before the sampling in such a manner that a digital signal sequence which has sufficient statistics results from the sampling. This can be achieved with a channel-specific filter 6, which has a unit pulse response $h_c \oplus (-t)$ and which is located before the adjoined baseband filter 7.

By sampling at points of time kT, the digital signal sequence $\{y_k\}$ is obtained, where $$y_k \triangleq \int_{-\infty}^{\infty} h^*(\tau - kT)y(\tau)d\tau \qquad \text{(XI)}$$

$$y_k = \sum_{i=-\infty}^{+\infty} X_{k-i} c_i + w_k$$

where $$X_{k-i} \triangleq \int_{-\infty}^{\infty} h^*(\tau - kT)h'(\tau - iT)d\tau \qquad \text{(XII)}$$

and $$w_k \triangleq \int_{-\infty}^{\infty} h^*(\tau - kT)w(\tau)d\tau \qquad \text{(XIII)}$$

$X_{k-i}$ are operators which have the form of an $M^L \cdot M^L$ matrix. If h(t)(see formula (X)) is different from 0 in an interval $\tau_0 - \tau_1 + T$, then the following applies:

$$X_{k-i} \begin{cases} = 0 \text{ if } |k-i| < L_c \\ = 0 \text{ otherwise} \end{cases} \qquad \text{(XIV)}$$

whereby $L_c$ is the greatest integer for which the following applies:

$$L_c T < T + \tau_1 - \tau_0.$$

$L_c$ is the interference length of the channel. The formula (XI) can thus be simplified to $$y_k = \sum_{i=-L_c}^{L_c} X_i c_{k-i} + w_k \qquad \text{(XV)}$$

The sequence $\{w_k\}$ is a sequence of mean-free, complex Gaussian random vectors with a correlation $$E[w_k \, w_i] = 2N_o X_{k-i} \qquad \text{(XVI)}$$

where $N_o$ is the spectral power density of the scalar, complex white noise w(t). The sequence $\{w_k\}$ is in general not white.

The optimization algorithm 8 will be described in more detail in exemplary embodiments below.

In accordance with a preferred embodiment of the invention, the optimization algorithm works according to the principle of the maximum likelihood. With a given signal y(t), the envelope curve v(t) is estimated which maximizes a likelihood function $p_w$. It follows from formula (IX) that $$\text{Log } p_w(y(t)|v(t)) = \qquad \text{(XVII)}$$

-continued $$-|\gamma_1| \int_{-\infty}^{+\infty} |y(t) - h_c^* v(t)|^2 dt + \gamma_2$$

$\gamma_1$ and $\gamma_2$ are constants which are meaningless in this context.

One now uses (X) in (XVII), uses (XI), (XII) and the fact that the matrix sequence $\{X_k\}$ is Hermitian, collects the terms which are dependent on symbol vectors $c_k$ and obtains a metric $J_n$ $$J_n\{c_k\} = J_{n-1}\{c_k\} + Z_n\{c_k\} \qquad \text{(XVIII)}$$

where $$Z_n\{c_k\} = 2 \text{ Re } c_n^+ y_n - c_n^+ X_o c_n - 2 \text{ Re } c_n^+ \sum_{i=1}^{L_c} X_i c_{n-i} \qquad \text{(XIX)}$$

If the symbol vectors $c_n \ldots c_{n-L}$ are defined so that $J_n$ is maximum, then at the same time v(t) is defined so that $p_w$ is maximum. Consequently a sequence of estimated symbols $\{\hat{a}_k\}$ is defined so that it corresponds to the sequence of symbols $\{a_k\}$ supplied by the data source 1 with the smallest possible error probability.

The sequence of symbol vectors $c_n \ldots c_{n-L}$ can be determined with an extended Viterbi algorithm. A Viterbi algorithm is, for example, shown in the printed publication mentioned at the beginning.

Figure 2:
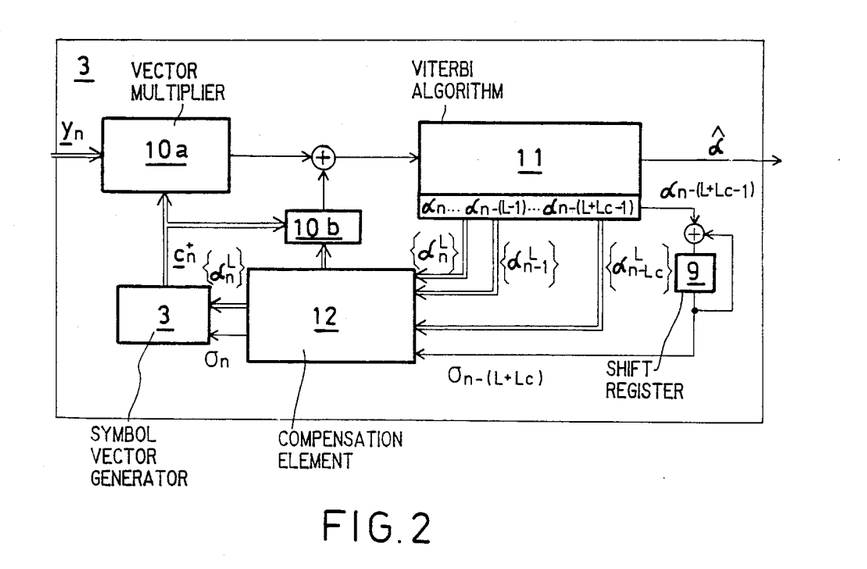
FIG. 2 shows a block diagram of an extended Viterbi algorithm.

FIG. 2 shows a block diagram of an optimization algorithm which works according to the principle of maximum likelihood. The single arrows indicate the data flow of complex, scalar quantities. Double arrows indicate the data flow of vector-value quantities and consist in general of a number of parallel, scalar data lines which corresponds to the number of the vector components.

A Viterbi algorithm 11 generates symbols $a_n \ldots a_{n-(L+L_c31\ 1)}$; which, for example, are forwarded in the form of sequences $\{a_N{}^L\}, \ldots \{a_{n-L_c}{}^L\}$ to a compensation element 12.

The compensation element 12 calculates a corrector vector of the form $$g_n = \frac{1}{2} X_{o-n} c + \sum_{i=1}^{L_c} X_{i-n-i} c \qquad \text{(XX)}$$

A symbol vector generator 3 generates $c_n^+$; a vector multiplier 10a generates the scalar products $c_n^+ y_n$. The scalar product $c_n^+ g_n$ is calculated in a vector multiplier 10b. The value supplied from the two vector multipliers 10a, 10b are added up and returned to the Viterbi algorithm 1, which multiplies the sum by two and forms the real part of the result, namely the increment $Z_n$. In each pulse kT, the Viterbi algorithm 11 determines from all possible symbols $a_n \ldots a_{n-(L+L_c-1)}$ those which maximize the increment $Z_n$.

An integrator, which can be formed for example with a shift register 9, generates the quantity $\sigma_{n-(L+L_c)}$, which is also introduced into the compensation element 12.

Figure 4:
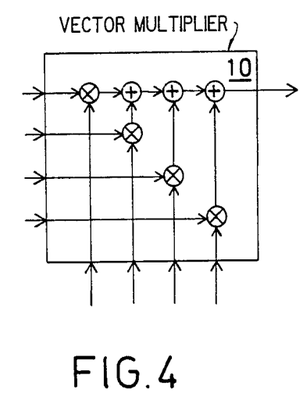
FIG. 4 shows a block diagram of a vector multiplier.

FIG. 4 shows an exemplary layout of a vector multiplier for $M^L=4$. The ML parallel, scalar inputs of the vector multiplier correspond in each case to a vector-value double arrow, as is used in FIG. 2.

Figure 5:
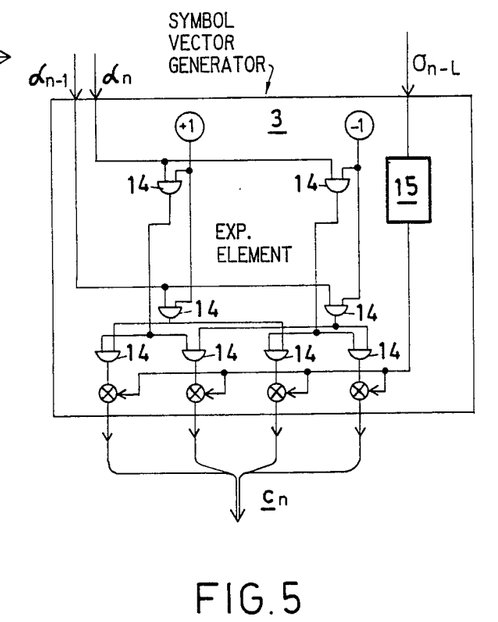
FIG. 5 shows a block diagram of a symbol vector generator.

FIG. 5 shows an exemplary layout of a symbol vector generator 3 for M=2 and L=2. Input quantities are $a_n$ and $a_{n-1}$ and $\sigma_{n-L}$. The input quantities $a_n$ and $a_{n-1}$ are logically combined with each other in the manner shown, and with the values of the value range, in this case +1 and −1, by means of UND gate 14. Together with a multiplicaton factor $\exp(j\pi h \sigma_{n-2})$, which is generated in an exponential element 15, 4 output quantities are obtained which form the individual components of the symbol vector $c_n$.

Figure 3:
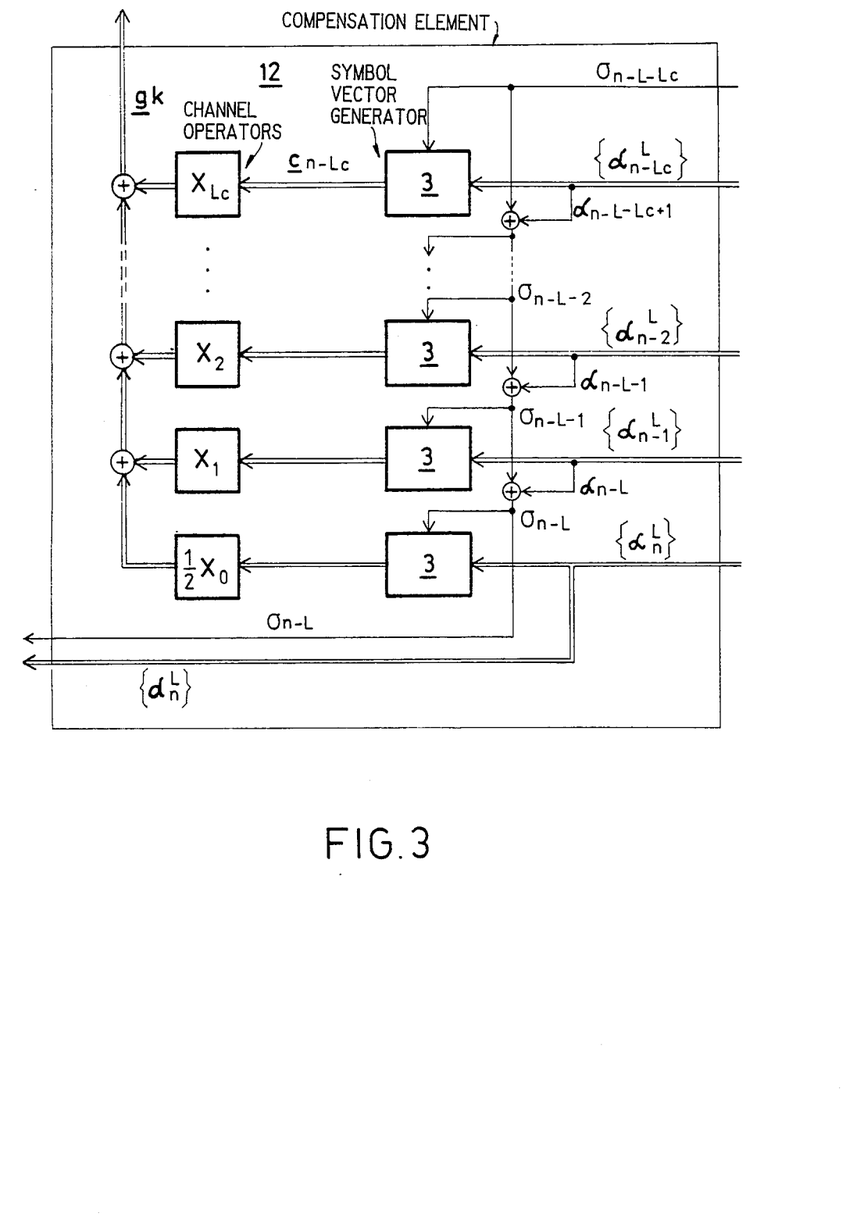
FIG. 3 shows a block diagram of a compensation element.

FIG. 3 shows the block diagram of the compensation element 12. The input quantities are $\sigma_{n-L-L_c}$ and the $L_c+1$ sequences of symbols $\{a_N{}^L\} \ldots \{a_{n-L}{}^L\}$. The compensation element 12 consists of $L_c+1$ parallel stages, in which in each case a symbol vector $c_{n-i}$ from a symbol vector generator 3 is transformed by an operator $X_i$ (in accordance with formula (XII)). (One should note that $c_n$ is transformed with the operator $X_o/2$.) The $L_c+1$ quantities are added and form the correction vector $g_k$.

The $\sigma_{n-L-i}$ are built up successively, by extracting in each case rom a sequence of symbols $a_{n-i}$ the symbol $a_{n-L-i}$ and adding it to $\sigma_{n-L-i}$. The quantities $a_{n-L}$ and $\{a_nN\}$ are output for the symbol vector generator 3 shown in FIG. 2.

In a further exemplary embodiment, a signal transmission process according to the invention will be described in which a conventional Viterbi algorithm is used in conjunction with a linear pre-emphasis filter.

Figure 6:
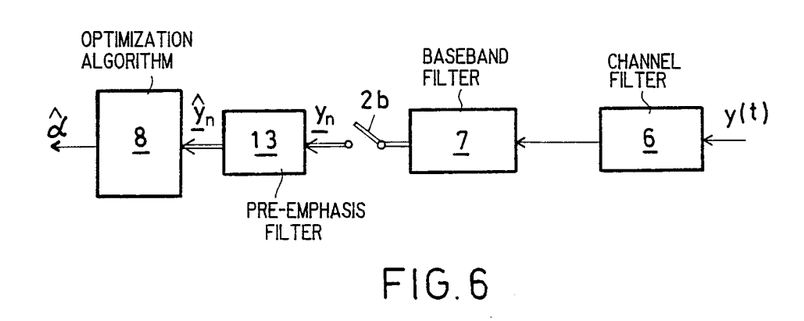
FIG. 6 shows a block diagram of a receiver with linear pre-emphasis filter.

FIG. 6 shows a block diagram of the part of the signal transmission process taking place in the receiver. A transmitted signal $y(t)$ runs through a channel-specific filter 7 and an adjoined baseband filter 8, which supplies a vector-value output quantity $y(t)$. This output quantity $y(t)$ is sampled by the sampling device $2b$ at points of time $kT$, sent through a linear pre-emphasis filter 13 and finally evaluated by a conventional optimization algorithm.

The linear pre-emphasis filter 13 transforms a digital signal vector $y_k$ into a de-emphasized signal vector $\hat{y}_k$. The de-emphasized signal vector $\hat{y}_k$ compensates the inter-symbol interference according to the principle of least error squares. In the baseband representation, the linear pre-emphasis filter 13 takes the following form:

$$i_k = \sum_{i=L_{eo}}^{L_{e1}} A_i y_{k-i} \tag{XXI}$$

$L_{eo}$, $L_{e1}$ are freely selectable integers. $A_i$ are complex $M^L \cdot M^L$ matrices which should be suitably chosen. In accordance with a preferred embodiment of the invention, they are selected so that an error square D $$D(\{A_i\}) = E[(\hat{y}_k - X_r c_k) + X_r^{-1}(\hat{y}_k - X_r c_k)], \tag{XXII}$$

where $$x_r = \int_0^T r^*(\tau) r'(\tau) d\tau$$

is minimum. This has the same meaning as that the error square D derived formally according to $A_m$ ($m = L_{eo} \ldots L_{e1}$) disappears:

$$E[X_r^{-1}(\hat{y}_k - X_r c_k) y_{k-m}{}^+] = 0. \tag{XXIII}$$

If formula (XXI) is used in this equation, discrete WienerHopf equations result:

$$x_r^{-1} \sum_{i=L_{e1}}^{L_{e1}} A_i R_{yy}(m - i) = R_{cy}(m) \tag{XXIV}$$

where $m = L_{eo} \ldots L_{e1}$ $R_{yy}$ and $R_{cy}$ are correlation matrices of the dimension $M^L \cdot M^L$:

$$R_{yy}(m) \doteq E[y_k y_{k-m}{}^+] \tag{XXV}$$

$$R_{cy}(m) \doteq E[c_k y_{k-m}] \tag{XXVI}$$

(It should be noted that the sequence of symbol vectors $\{y_k\}$ and the sequence of symbol vectors $\{c_k\}$ are stationary random variables.) The Wiener-Hofp equations (XXIV) form a linear system of equations which determine the matrices $A_i$. The solution of this system can be calculated with known numerical methods.

The length $L_e = L_{e1} - L_{eo} + 1$ of the pre-emphasis filter has an effect on the error probability $P_e$ of the sequence of estimated symbols $\hat{a}$: the larger $L_e$ is, the smaller the error probability $P_e$. A quantitative connection between $L_e$ and $P_e$ is however difficult to determine. As a rule it is advisable to keep $L_e$ in the order of magnitude of double the interference length $L_c$ of the channel 5 (FIG. 1).

Figure 8:
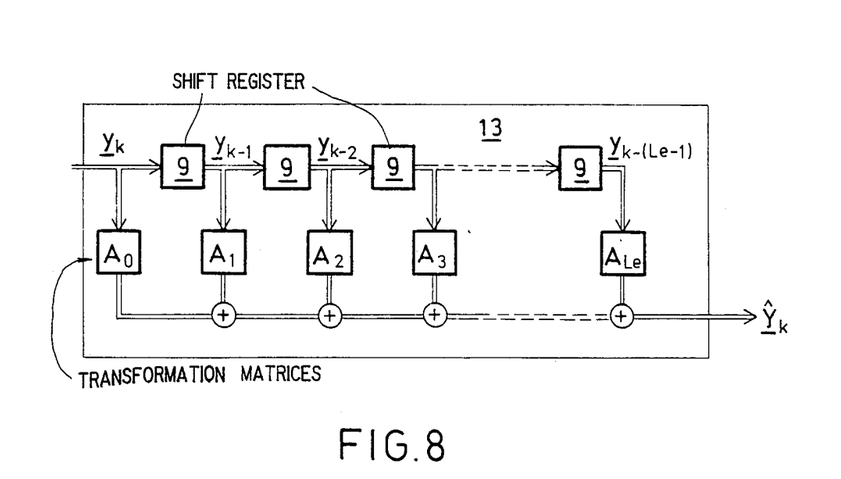
FIG. 8 shows a block diagram of a linear pre-emphasis filter.

FIG. 8 shows a block diagram of a linear pre-emphasis filter. A signal vector $y_k$ runs through a number $L_e$ of delay stages, which can be realized, for example, by shift register 9. In each stage, the signal vector $y_{k-i}$ is transformed with the corresponding transformation matrix $A_i$. The transformed signal vectors are all added, which results in the de-emphasized signal vector $\hat{y}_k$.

Figure 7:
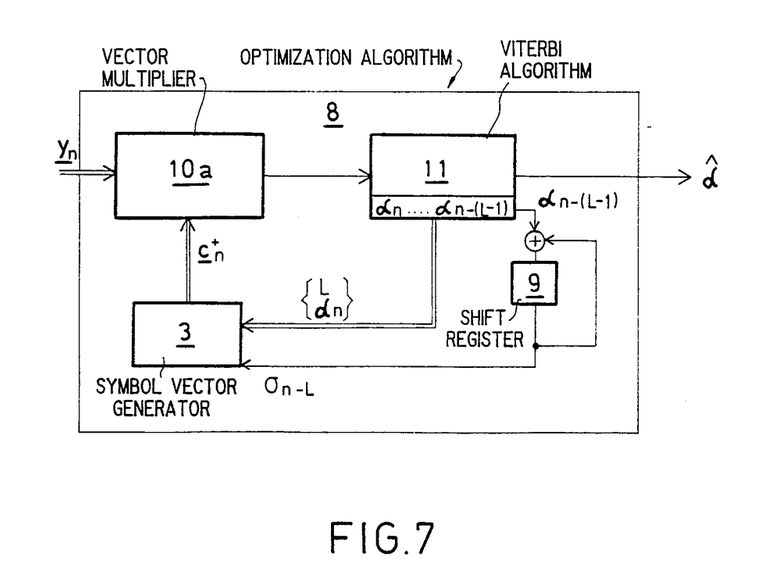
FIG. 7 shows a block diagram of a simple Viterbi algorithm.

FIG. 7 shows the block diagram of an optimization algorithm with a Viterbi algorithm such as can be used to evaluate the de-emphasized signal vectors $\hat{y}_k$.

A Viterbi algorithm 11 generates symbols $a_n \ldots a_{n-(L-1)}$, which are forwarded, for example, in the form of a vector $a_n$ to a symbol vector generator 3. This generates the symbol vector $c_n{}^+$. A vector multiplier $10a$ forms the scalar product $c_n{}^+ y_n$, which is returned to the Viterbi algorithm 11. In each pulse, the Viterbi algorithm 11 determines from all possible sequences of symbols $a_n \ldots a_{n-(L-1)}$ the sequence which maximizes the increment $Z_n$.

$$Z_n = 2 \operatorname{Re} c_n{}^+ y_n \tag{XXVII}$$

An integrator, which can be realized, for example, with the aid of a shift register 9, generates the quantity $\sigma_{m-L}$, which is also required for calculating the symbol vector $c_n{}^+$.

The performance of a signal transmission process is measured for a given signal-to-noise ratio (SNR) according to the error probability $P_e$ of the sequence of estimated symbols $\{a_k\}$. The error probabilities $P_e$ of 2 receivers according to the invention, the one equipped with an optimization algorithm according to the principle of maximum like-lihood and the other equipped with a linear pre-emphasis filter, will now be compared below with the error probability of a conventional receiver.

Channels with a unit response of the form $$h_c(t) = a(\delta(t) + b e^{j\Phi_i} \delta(t - \tau_s)) \tag{XXVIII}$$

are assumed. $\delta(t)$ denotes a Dirac pulse. The individual parameters have the following values:

$$a = 1 \quad \quad \quad \quad \quad \quad \quad \quad \quad \quad \text{(XXIX)}$$
$$b = 0.5$$
$$\tau_s = T/2 (\rightarrow L_c = 1)$$
$$\phi_o = \nu \frac{\pi}{4}, \nu = 0, 1, \ldots, 7$$

The signal transmission process uses a baseband filter with a phase pulse which extends over L=3 pulses, and a derivation of which has the form of an increased cosine:

$$\frac{d}{dt} q(t) = \begin{cases} \frac{1}{2LT} \left( 1 - \cos\left(\frac{2\pi t}{LT}\right) \right), & 0 \leq t \leq LT \\ 0 \end{cases} \quad \text{(XXX)}$$

otherwise
The modulation index is h=½.

The data source supplies symbols with values +1 or −1, ie. M=2. With the linear pre-emphasis filter built into one of the two receivers according to the invention $L_{eo}=0$ and $L_{e1}=4$.

For the purposes of comparison, a signal transmission process, as is known for example from the printed publication mentioned at the beginning, will be used.

Figure 9:
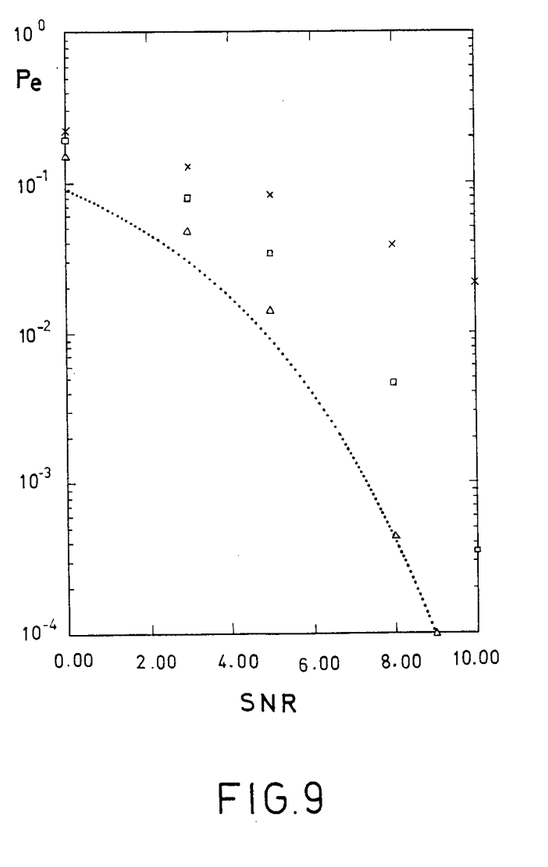
FIG. 9 shows an illustration of the average error probability as a function of the signal-to-noise ratio.

FIG. 9 shows the results which were determined by a simulation with the abovementioned parameters.

The individual symbols designate:
x Signal transmission process according to the prior art
Δ Signal transmission process according to the invention with an optimization algorithm which works according to the principle of maximum likelihood.
□ Signal transmission process according to the invention with a linear pre-emphasis filter The dotted curve is an analytical approximation of the minimum error probability for an ideal channel ($L_c=0$). The approximation used here is derived and evaluated in the printed publication mentioned at the start.

The values marked in FIG. 9 form a mean value of the error probabilities of the eight various channels, as they are determined by the formulae (XXVIII) and (XXIX) (only the phase $\Phi_o$ of channel 5 is varied).

It is obvious that the best results can be obtained with an optimization algorithm according to the principle of maximum likelihood. The results of the linear pre-emphasis filter are also clearly better than those of the known signal transmission process.

In general with the signal transmission process according to the invention, a process is available, the error probability of which can be restricted to a minimum value even when transmission is via a non-ideal channel.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A signal transmission process transmitting digital data from a transmitter to a receiver according to a continuous phase modulation method, comprising the steps of:

(a) converting digital data which are present as a sequence of symbols $a_k$, which symbols have a given time interval T and may assume M values, into a symbol vector $c_k$ or $M^L$ components;
(b) converting said symbol vector $c_k$ into a time-dependent scalar envelope signal v(t) using a baseband filter having a characteristic r(t) of $M^L$ components, where $$v(t) = \sum_{K=-\infty}^{+\infty} c_k' r(t - kT);$$

(c) phase modulating a carrier wave according to the envelope signal v(t) and transmitting said modulated carrier wave to a receiver via a channel with a given unit pulse response $h_c(t)$, an additive, white Gaussian noise w(t) being superimposed, so that at a receiver the envelop signal v(t) is transformed into a signal y(t) of the form $$y(t) = h_c * v(t) + w(t),$$

where "*" denotes a convolution product;
(d) demodulating said carrier wave into said signal y(t);
(e) filtering said signal y(t) by a channel specific filter of the form $h_c*(-t)$ for getting sufficient statistics in a subsequent sampling step;
(f) filtering said filtered signal y(t) by an adjoined baseband filter of $M^L$ components of the form $$r^{3o}(-t),$$

wherein "+" denotes conjugate complex;
(g) sampling the filtered signal produced by step (f) after the adjoined baseband filter at points of time kT, where k denotes an integer; and
(h) determining, based on the sampled filtered signal produced by step (g), a sequence of estimated symbols $\hat{a}_k$ by an optimization algorithm.

2. A signal transmission process transmitting digital data from a transmitter to a receiver according to a continuous phase modulation method, comprising the steps of:
converting digital data which are present as a sequence of symbols $a_k$, which symbols have a given time interval T and may assume M values, into a symbol vector $c_k$ of $M^L$ components;
converting said symbol vector $c_k$ into a time-dependent scalar envelop signal v(t) using a baseband filter r(t) of $M^L$ components, where $$v(t) = \sum_{K=-\infty}^{+\infty} c_k' r(t - kT);$$

phase modulating a carrier wave according to the envelope signal v(t) and transmitting said modulated carrier wave to a receiver via a channel with a given unit pulse response $h_c(t)$, an additive, white Gaussian noise w(t) being superimposed, so that at a receiver the envelope signal v(t) is transformed into a signal y(t) of the form $$y(t) = h_c * v(t) + w(t),$$

where "*" denotes a convolution product;
demodulating said carrier wave into said signal y(t);

first filtering said signal y(t) by a channel specific filter of the form $h_c^*(-t)$ to produce a first filtered signal for getting sufficient statistics in a subsequent sampling step;

second filtering said first filtered signal y(t) by an adjoined baseband filter of $M^L$ components of the form $r^+(-t)$ where "+" denotes conjugate complex, thereby producing a second filtered signal;

sampling the second filtered signal after the adjoined baseband filter at points at time kT, where k denotes an integer; and determining, based on the sampled second filtered signal, a sequence of estimated symbols $\hat{\alpha}_k$ by a Viterbi algorithm extended by a compensation element maximizing an increment $Z_n$ of the form, $$Z_n\{c_k\} = 2\text{Re}c_n^+y_n - c_n^+X_0c_n - 2\text{Re}c_n^+ \sum_{i=1}^{L_c} X_i c_{n-i}$$

where
$c_n$ = symbol vector,
$y_n$ = signal vector,
$X_i$ = channel operator, and
$L_c$ = channel interference length.

3. A signal transmission process transmitting digital data from a transmitter to a receiver according to a continuous phase modulation method, comprising the steps of:

converting digital data which are present as a sequence of symbols $\alpha_k$, which symbols have a given time interval T and may assume M values, into a symbol vector $c_k$ of $M^L$ components;

converting said symbol vector $c_k$ into a time-dependent scalar envelop signal v(t) using a baseband filter r(t) of $M^L$ components, where $$v(t) = \sum_{K=-\infty}^{+\infty} c_k^t r(t - kT);$$

phase modulating a carrier wave according to the envelope signal v(t) and transmitting said modulated carrier wave to a receiver via a channel with a given unit pulse response $j_c(t)$, an additive, white Gaussian noise w(t) being superimposed, so that at the receiver the envelope signal v(t) is transformed into a signal y(t) of the form $y(t) = h_c^* v(t) + w(t),$ where "*" denotes a convolution product;

demodulating said carrier wave into said signal y(t);

first filtering said signal y(t) by a channel specific filter of the form $h_c^*(-t)$ to produce a first filtered signal for getting sufficient statistics in a subsequent sampling step;

second filtering said first filtered signal y(t) by an adjoined baseband filter of $M^L$ components of the form $r^+(-t)$ where "+" denotes conjugate complex, thereby to generate a signal vector y(t) of $M^L$ components;

sampling the signal vector y(t) at points of time kT, where k denotes an integer, thereby generating a digital signal vector $y_k$; and transforming said digital signal vector $y_k$ into a de-emphasized signal vector $\hat{\gamma}_k$ using a pre-emphasis filter which functions according to the principle of lease error squares in the sense that the expectation value $D\{A_i\} = E[(\hat{\gamma}_k - X_{r-k}c)^+ X_r^{-1}(\hat{\gamma}_k - X_{r-k}c)],$ where $$X_r \equiv \int_o^T r^*(\tau)r'(\tau)d\tau, \text{ where}$$

$\hat{\gamma}_k$ = de-emphasized signal vector
$X_r$ = channel operator of the white channel
$c_k$ = symbol vector is minimized; and determining, based on the de-emphsized signal vector $\hat{\gamma}_k$, a sequence of estimated symbols $\hat{\alpha}_k$ by an optimization algorithm.

4. A signal transmission process as claimed in claim 3, wherein the sequence of estimated symbols are determined using a Viterbi algorithm.

* * * * *